United States Patent Office 2,933,516
Patented Apr. 19, 1960

2,933,516

PROCESS OF MAKING 20-SEMI CARBAZONE DERIVATIVES OF 17-ACYLOXYMETHYL CARBONYL PREGNANE COMPOUND

Robert E. Jones, Rahway, and Samuel A. Robinson, Scotch Plains, N.J., assignors to Merck & Co., Inc., Rahway, N.J., a corporation of New Jersey No Drawing. Application January 13, 1956
Serial No. 558,837

17 Claims. (Cl. 260—397.45)

This invention relates to the preparation of steroidal hormone intermediates and particularly to the preparation of ketone derivatives of steroids having attached to the nucleus an acyloxymethylcarbonyl radical.

This application is a continuation-in-part of our copending application Serial No. 388,672, filed October 27, 1953, now abandoned.

The necessity for the protection of one or more ketone groups in steroid compounds during various chemical reactions is well established in the field of steroid chemistry. Nuclear keto groups in steroids can be protected by conversion to the corresponding ethylene-dioxy derivatives or by reaction with a nitrogenous ketone reagent such as the semicarbazides.

The only method, however, that has previously been found effective for protecting the 20-ketone group in a steroid having an acyloxymethylcarbonyl radical in side chain attached to the D ring at the 17 carbon atom is a three step process. This process involves first hydrolyzing to replace the acyl group with hydrogen and then reacting the carbonyl group with a nitrogenous ketone reagent such as hydroxylamine, semicarbazide, etc. to form the corresponding oxime or semicarbazone, and finally acylating to reconvert the hydroxyl group into the acyloxy group. Subsequently, after the desired chemical reactions, the carbonyl group is regenerated by hydrolysis. This process not only involves three separate steps but also has the disadvantage that the side chain at the 17 carbon atom is sensitive to the conditions of basic hydrolysis and therefore the hydrolysis of the acyloxy group must be carried out very carefully to avoid rearrangement or oxidation of the reactive side chain.

According to the present invention, it has been discovered that steroids having an acyloxymethylcarbonyl radical

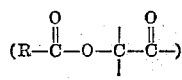

attached to the steroid nucleus or as part of a side chain may be reacted directly with a nitrogenous ketone reagent by maintaining the pH of the reaction within the range of approximately 3.0 to 6.0 thereby forming the corresponding steroid wherein the oxygen atom of the carbonyl group of the radical is replaced by a nitrogenous substituent reconvertible to the ketone by reaction with a hydrolyzing agent. This discovery enables the ketone group to be protected during subsequent reactions by a simple and effective one step process. This direct reaction is surprising since it has been the belief of skilled steroid chemists that steroids which have an acyloxymethylcarbonyl radical were unreactive to nitrogenous ketone reagents at the carbonyl group because of the steric hindrance caused by the neighboring acyloxy group.

In accordance with one embodiment of this invention, a steroid having a C-17 side chain substituted at C-20 by a keto group and at C-21 by an acyloxy radical can be reacted with a nitrogenous ketone reagent at a pH of approximately 3.0 to 6.0 thereby forming the corresponding steroid wherein the oxygen atom in the keto group at the 20 position is replaced by a substituent reconvertible to the ketone by hydrolysis. This reaction may be chemically represented, insofar as the change occurring in the group attached to ring D of the steroid nucleus is concerned, as follows:

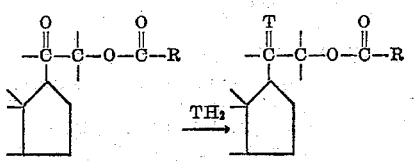

wherein R is a hydrocarbon group such as an alkyl, aryl, aralkyl or alkaryl radical and T is a divalent radical of a nitrogenous ketone reagent formed by the removal of two hydrogen atoms from a single nitrogen atom in the reagent.

It is essential to this invention that the pH of the reaction be maintained within the range of approximately 3.0 to 6.0. The pH of the reaction being the actual observed pH of a sample of the reaction mixture diluted with an equal volume of water. It is preferred, however, to maintain the pH within the range of 4.0 to 5.2 to maintain optimum reaction conditions. It is desirable when using an acid salt as the nitrogenous ketone reagent to have a weakly basic material present as a buffer such as sodium bicarbonate, sodium acetate, pyridine or various phosphates.

The process of this invention is preferably carried out by bringing into intimate contact the steroid and the ketone reagent in a substantially inert solvent. The reaction proceeds slowly at normal room temperature and it is ordinarily desirable to conduct the reaction at the reflux temperature of the solvent. The product is recovered from the reaction mixture by conventional methods such as by removing the solvent by distillation and/or by filtration of the reaction mixture after dilution with water.

The solvent may be any solvent which is non-reactive with the particular ketone reagent employed such as alcohols, amides, nitriles and ethers. Typical examples of such solvents are methanol, propanol, butanol, dimethylformamide, dimethylacetamide, acetonitrile, dioxane and tetrahydrofuran.

The ketone reagent may be any reagent that will replace the oxygen atom of the ketone group thereby forming the characteristic imido double bond linkage of oximes or carbazones and which may be readily reconverted to the ketone by reaction with a hydrolyzing agent. Examples of these nitrogenous ketone reagents are semicarbazides, hydrazines, thiosemicarbazides, hydroxylamines, and substituted products and acid salts thereof such as ethylphenylhydrazine, methylhydroxyl amine, and their hydrochloride salts. The ketone reagent is usually present in excess of the amount theoretically required to react with the keto substituent to insure optimum yield in the minimum of time. It is desirable when using a ketone reagent such as an acid salt to employ a small amount of water to dissolve the ketone reagent before adding it to the reaction mixture to speed neutralization of the acid group of the reagent by the buffer.

The steroid compounds employed in this process may be saturated or unsaturated, and may contain other functional substituents attached to the steroid nucleus. Thus, the steroid nucleus may be unsaturated such as the 1:2, 4:5, 7:8, 9:11 and/or 11:12 positions. In addition, nuclear substituents may be present in the steroid structure, such as keto groups at the 3, 6, 7, 11, 12 and 16 positions and/or hydroxyl substituents such as at positions 3, 6, 7, 11, 12, 17 and 21 positions, alkyl at the 2 position and/or acyloxy

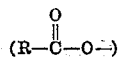

substituents at the 3, 6, 7, 11 and 12 positions. Other substituents may also be present at various positions of the molecule such as alkoxy or amino groups. Typical examples of such compounds are pregnanes, allopregnanes and pregnenes (the term pregnene is meant to include pregnanes having all degrees of unsaturation and particularly in the A ring) such as 21-acylates of the following compounds: 4-pregnen-17α,21-diol-3,20-dione; 4-pregnene-11β,17α,21-triol-3,20-dione; 4-pregnen-17α,21-diol-3,11,20-trione; 4-pregnen-21-ol-3,11,20-trione; allopregnane-3,21-diol-11,20-dione; allopregnane-3,11,21-triol-20-one; pregnane-3,21-diol-11,20-dione; 4,9(11)-pregnadien-17α,21-diol-3,20-dione; 5-pregnene-3,21-diol-20-one; 1,4-pregnadien-17α,21-diol-3,20-dione; 1,4-pregnadiene-11β,17α,21-triol-3,20-dione; 1,4-pregnadien-17α,21-diol-3,11,20-trione; 2-methyl-4-pregnen-17α,21-diol-3,11,20-trione and 2-methyl-4-pregnen-17α,21-diol-3,20-dione. There is no limitation on the acylate which can be present, thus acyl groups derived from organic carboxylic acids having up to 25 carbons are operative. Typical of such acids are propionic, n-butyric, isobutyric, methylethylacetic, n-caproic, heptanoic, caprylic, capric, lauric, myristic, palmitic, n-margaric, stearic, oxalic, glutaric, adipic, succinic, phthalic, naphthalic acid (1,8), dimethyl glutaric, acrylic, crotonic, oleic, ricinoleic, t-butylacetic, methylsuccinic, p-nitrobenzoic, decanoic, p-methoxybenzoic, 2-ethylhexanoic, valeric, ethoxyacetic, tartaric, tricarballylic, cyclobutanecarboxylic, cyclopentylacetic, β-cyclopentylpropionic, m-toluic, β-phenylpropionic, 2,4,6-trimethylbenzoic, o-phenylbenzoic, 1-acenaphthoic, m-xylenylacetic, 4-fluorenecarboxylic, 2-phenanthroic, 2-furoic, 2-tetrahydrofurylacetic, 2-pyridinecarboxylic, 1,2-cyclohexanedicarboxylic, phenylsuccinic, fumaric, cyclohexylideneacetic, cinnamic, α-naphthylacrylic, fluoroacetic, o-chlorobenzoic, p-fluorobenzoic, o-chlorophenylacetic, β-hydroxypropionic, ε-hydroxycaproic, p-hydroxybenzoic, 3,4-dihydroxybenzoic, β-benzoylpropionic, abietic, cholic, desoxycholic, lithocholic, chloroacetic and diethylacetic.

In a preferred mode of operation approximately one molar equivalent of steroid having a single keto group which is in an acyloxymethylcarbonyl radical attached to the D ring of a steroid nucleus at the 17 carbon atom is suspended or dispersed in a mixture of methanol and dimethylformamide. An aqueous solution of approximately 1.5 to 2.0 moles of a hydrochloride salt of a ketone reagent buffered at approximately pH 4.0 to 5.2 by the addition of a weakly basic material such as sodium bicarbonate, is then added to the solvent suspension. The mixture is held at the reflux temperature of the solvent for approximately three and one-half hours with continual stirring and then at approximately 40° C. for about 15 hours. When the steroid molecule contains additional reactive keto groups the amount of reagent is multiplied by the number of reactive keto groups present except that an 11-keto group will be unreactive to the reagent under these conditions. When the reaction is carried out in this manner, the ketone derivative is formed in nearly quantitative amounts.

The following examples are given for purposes of illustration:

*Example 1*

Ten grams of Δ⁴-pregnen-17α-ol-3,11,20-trione-21-acetate (melting point 244–245° C., E% 392 at 2380μ) was suspended in a mixture of 268 cc. of methanol, 89.3 cc. of dimethylformamide, 8.6 cc. of water, 13.6 grams of semicarbazide hydrochloride and 7.4 grams of sodium bicarbonate. The stirred suspension having a pH of approximately 4.0 to 5.2, was heated under reflux at about 70 to 71° C. for three and one-half hours, after which time essentially all the suspended material was in solution. The temperature was rapidly reduced to 40–45° C. and held at this point for 21½ hours. A heavy crystalline (long slim needles under the microscope) precipitate had formed after one hour at reduced temperature. At the end of the heating period, the suspension was cooled to room temperature and 358 cc. of water was carefully added. The crystalline slurry was aged for two hours at 0 to 5° C. and filtered. The cake was washed free of halide ions and dried under vacuum to give substantially pure Δ⁴-pregnen-17α-ol-11-one-3,20-disemicarbazone-21-acetate. Dry weight 12.7 grams (99.3%). The infrared spectrum of this compound showed it to be an acetate derivative ("bands at 5.80 and 7.97μ").

*Example 2*

A mixture of 5.0 grams (0.0104 m.) of 4-bromo-pregnan-17α-ol-3,11,20-trione-21-acetate and 75 cc. of acetonitrile was prepared. The temperature of the mixture was adjusted to 25° C. and a second mixture was added consisting of 2.54 grams of semicarbazide hydrochloride and 1.73 grams of sodium bicarbonate which had been allowed to react with 1.5 cc. of water for one-half hour. One cubic centimeter of water was used for transfer (total vol., 2.5 cc.). The resulting mixture, having a pH of approximately 4.0 to 5.2, was stirred in a nitrogen atmosphere for three and one-half hours at 25°±5° C. The development of an orange color was noted soon after addition of the semicarbazide followed by a rapid disappearance of color. At the end of the three and one-half hours, the acetonitrile was removed by distillation under reduced pressure until a nearly dry residue remained. To this residue was added a mixture of 38 cc. of dimethylformamide, and 186 cc. of methanol. Approximately 5.65 grams of solid semicarbazide hydrochloride and 3.07 grams of solid sodium bicarbonate were washed in the mixture with 3.6 cc. of water. The resulting mixture was refluxed for three hours and then cooled to 45° C. and held at approximately this temperature for 21 hours. After cooling to room temperature, 700 cc. of a salt solution prepared from 80 parts of saturated salt solution and 20 parts of water was added. This slurry was allowed to age for several hours at 0 to 5° C. to insure complete crystallization. Filtration was followed by fourteen displacement water washes to free the product, Δ⁴-pregnen-17α-ol-11-one-3,20-disemicarbazone-21-acetate, from chloride ions. After drying in vacuo at 45° C. the weight was 4.27 grams (79.8% as the acetoxydisemicarbazone).

*Example 3*

A mixture of 1.48 grams of allopregnane-3β,17α-diol-11,20-dione-21-acetate, 1.0 gram of semicarbazide hydrochloride, 0.567 gram of sodium acetate and 45 cc. of methanol having a pH of approximately 4.0 to 5.2, was heated and stirred at reflux temperature for approximately 24 hours. At this point the solution was chilled in an ice bath and to it was added 0.28 gram of sodium acetate and 45 cc. of water, whereupon crystals of the product separated from solution. The product allopregnane-3β,17α-diol-20-semicarbazone-21-acetate-11-one, was removed by filtration and dried. Melting point 242 to 245° C. It was then recrystallized from ethanol to give substantially pure product, melting point 267 to 268° C.

*Example 4*

A sample of 48.04 grams (0.124 mole) of 11-dehydrocorticosterone acetate was suspended in a mixture of 1200 ml. methanol and 300 ml. dimethylformamide. A slurry of semicarbazide hydrochloride (68.0 grams, 0.61 mole) and sodium bicarbonate (37.0 grams—0.44 mole) in 30 ml. of water was made up separately and added to the stirred suspension with nitrogen flowing through the system. Ten ml. additional water (total water 40 ml.) was used to wash in the last portion of the slurry. The mixture, having a pH of approximately 4.0 to 5.2, was brought to reflux temperature and kept at gentle reflux. After five minutes of reflux, most of the material dissolved. At the end of 3.5 hours of reflux it was cooled to 45° C. and kept at 45° C. seventeen hours. A moderately heavy precipitate had formed. The solution was light yellow in color. The mixture was then cooled to 25° C. and four liters of 50% saturated sodium chloride solution were slowly added. The temperature was lowered to 0° C. and kept at 0° C. for two hours. The precipitate was filtered and the slurry washed with cold water (10° C.) until the washings were chloride ion free. The material was air dried at 60° C. Yield was 58.05 grams containing 0.6% water. The product (3,20-disemicarbazone of 11-dehydrocorticosterone acetate) darkened at 250° C. and did not melt up to 310° C. U.V.—max. 2690 A., E% 777; 2450 A., E% 477. N-analysis—calc. 16.79%; found 16.53%. I.R. spectrum—acetate band at $5.72\mu$.

Example 5

A mixture of five grams of cortisone acetate (0.0124 mole), 134 cc. methanol, 44.8 cc. dimethylformamide, and 4.0 cc. $H_2O$ was purged six times with nitrogen and subjected to a vacuum. Hydroxylamine hydrochloride (3.84 grams, 0.0553 mole) and sodium bicarbonate (5.48 grams, 0.0653 mole) were added to the mixture and the solution having a pH of approximately 4.0 to 5.2, refluxed with stirring in a nitrogen atmosphere for four hours. The heat was then reduced to 45±2° C. and held for twenty hours. The hazy solution was then cooled to 0 to 5° C. and 179 cc. of water and 179 cc. of a saturated salt solution was added and the white, suspended product aged at 0 to 5° C. for three hours, then filtered and washed until halide free and neutral with water. The product was the 3,20-dioxime of cortisone acetate.

Example 6

Five grams of cortisone acetate (0.0124 mole), 134 cc. of methanol, 44.8 cc. dimethylformamide and 4.3 cc. water were purged with nitrogen. To the mixture was added 10.95 grams 2,4-dinitrophenylhydrazine (0.0553 mole) and 4.48 cc. 2.5 N hydrochloric acid (0.0112 mole) and the mixture, having a pH of approximately 4.0 to 5.2, refluxed for four hours; after which the temperature was reduced to 45±2° C. and held for twenty hours. The orange slurry became a reddish, very heavy, mass. The mixture was then cooled to room temperature, filtered and washed with ice cold methanol. The product was 3,20-di-(2,4-dinitrophenylhydrazone)-cortisone acetate.

Example 7

Five grams of cortisone acetate (0.0124 mole), 134 cc. of methanol, 44.8 cc. of dimethylformamide, and 4.3 cc. of water were mixed and purged with introgen. A mixture of 5.04 grams thiosemicarbazide (0.553 mole) and 4.48 ml. of 2 N hydrochloric acid (0.0112 mole) were added and the solution, having a pH of approximately 4.0 to 5.2, refluxed under nitrogen for four hours. The light suspension was then cooled to 45±2° C. and held at this temperature for 25 hours. The mixture was then cooled to room temperature and the suspension filtered and washed three times with 10 cc. methanol and five times with 10 cc. of water. The product, 3,20-dithiosemicarbazone of cortisone acetate, was washed with a mixture of methanol and an 80% saturated salt solution and the suspension aged 0° C. for three hours, filtered, and washed with water. Melting point 207° C. (dec.), and U.V.:E% 287 at 2440 A.; E% 750 at 3000 A.

Example 8

Ten grams of cortisone acetate, 268 cc. methyl alcohol and 8.6 cc. water were mixed and purged with nitrogen and subjected to a vacuum. Following this 13.6 grams semicarbazide hydrochloride and 7.7 grams sodium carbonate were added and the solution, having a pH of approximately 4.0 to 5.2, was refluxed in a nitrogen atmosphere with stirring for three and one-half hours. The temperature was then reduced to 45±2° C. and held there for twenty and one-half hours. The suspension was allowed to cool to room temperature and then 358 cc. water added. The mixture was filtered after aging at 0° C. for three hours. The product, 3,20-disemicarbazone of cortisone acetate was then washed with water.

Example 9

Ten grams pregnane-3β,17,21-triol-11,20-dione-21-acetate (0.0146 mole), 271 cc. methanol and 8.7 cc. water were mixed and the solution purged with nitrogen. To the mixture 6.23 grams semicarbazide hydrochloride (0.0558 mole) and 3.73 grams sodium carbonate (0.0444 mole) were added and the solution having a pH of approximately 4.0 to 5.2 was refluxed for four hours. The heat was then reduced and held for twenty hours at 45±2° C. At the end of this period the solution was concentrated in vacuum to 100 cc. and 300 cc. of water were added to the white suspension. This was aged at 0 to 5° C. for three hours; filtered, and washed neutral and halide free with water. The product was pregnane - 3β,17,21 - triol - 11,20 - dione - 21 - acetate-20-semicarbazone. Yield: 10.8 grams (94.8%). Melting point: eff. at 248° C. (no darkening).

Example 10

Three and eight-tenths grams (3.8 grams) (0.0082 mole) of pure cortisone benzoate was suspended in 88 cc. of methanol, 29 cc. of dimethylformamide and 2.8 cc. of water. The mixture was purged six times alternatively using nitrogen and vacuum and then 4.06 grams (0.036 mole) of semicarbazide hydrochloride plus 2.44 grams of sodium bicarbonate were added. The suspension having a pH of approximately 4.0 to 5.2, was heated under reflux for four hours; complete solution was observed at the reflux point, but after two hours a crystalline precipitate had formed. The suspension was cooled to 45°±2° C. and stirred (nitrogen atmosphere) for twenty hours. After cooling the heavy suspension to 0 to 5° C., 117 cc. of water was added and the suspension aged at 0 to 5° C. for two hours. The white product was filtered, washed halide free with water, and dried at 60° C. in vacuum. Weight: 4.60 grams (97.0%). Melting point: 212–220° C. (dec.). N anal.: calc. for disemicarbazone, 14.52%; found 13.71%.

Example 11

A mixture of 1.11 grams (0.0025 mole) of 4-pregnen-17α,21-diol-3,11,20-trione 21-pivalate in 29 cc. of methanol, 9 cc. of dimethylformamide and 0.86 cc. of water was purged with nitrogen. To the purged mixture was added 1.36 grams of semicarbazide hydrochloride and 0.74 gram of sodium bicarbonate. The mixture was heated under reflux for about two hours and, after the bath temperature was reduced to 45° C. (±5°), was warmed for sixteen hours. A mass of long, slim needles soon formed after reducing the temperature. After the above sixteen hour period, the mixture was cooled to room temperature and 36 cc. of water was carefully added with stirring. This was worked up in the standard way, involving dilution with water, aging in ice for ca. one hour, filtration, washing with four or five displacements of water, air-drying and then vacuum drying at 60 to 70° C. Yield: 1.40 grams of pure product. Nitrogen anal.: calculated as $C_{28}H_{42}N_6O_6$, 15.04%. Found: 14.75%.

U.V. absorption, $\lambda_{SH. 2420, E\% 395}^{Max. 2675, E\% 550}$, melting point >300° C

Example 12

In a 50 cc. flask, a mixture of 478.6 mg. (0.001 M.) of 4-pregnen-17α,21-diol-3,11,20-trione 21-phenylacetate, 11.6 cc. of methanol, 3.6 cc. of dimethylformamide and 0.344 cc. of water was made and purged with nitrogen. To the above was added 0.542 gram of semicarbazide hydrochloride and 0.296 gram of sodium bicarbonate and the mixture heated under reflux for four hours. The temperature of the heating bath was reduced to 45 to 50° C. and the reaction mixture allowed to heat overnight. Upon cooling, a heavy deposit of microcrystalline needles formed and crystallization was completed by slow addition of 14.5 cc. of water. This was worked up in the usual way involving dilution with water, aging in ice for ca. one hour, filtration, washing with four or five displacements of water, air-drying and then vacuum drying at 60 to 70° C. Weight 0.545 gram (92%). Melting point S. 200° C., dec. 225° C.

U.V., $\lambda_{Sh. 2420, E\% 418}^{Max. 2680, E\% 585}$

N anal.: calcd. 14.18%; Found 13.94%.

*Example 13*

To 11.6 cc. of methanol, 3.6 cc. of dimethylformamide and 0.344 cc. of water was added 478.6 mg. (.001 M.) of 4-pregnen-17α,21-diol-3,11,20-trione 21-o-methyl benzoate and the solution purged with nitrogen. Then, 0.542 gram of semicarbazide hydrochloride and 0.296 grams of sodium bicarbonate was added and the entire mixture heat under reflux for three to four hours. The steroid was slow to go into solution (25 minutes) and, after about two hours reflux, long needles of the disemicarbazone began to crystallize. After about four hours, the temperature was reduced to 45 to 50° C. and the mixture was then heated overnight. Upon cooling, slowly adding 14.5 cc. of water, the material was then worked up in the usual manner involving dilution with water, aging in ice for ca. one hour, filtration, washing with four or five displacements of water, air-drying and then vacuum drying at 60 to 70° C. Yield: 0.550 gram (93%). U.V. λmax. 2680, E% 648; λmax. 2360, E% 548. N calculated for $C_{31}H_{40}N_6O_6$, 14.18%; found, 14.04%.

*Example 14*

A (nitrogen) purged mixture of 542.7 mg. (0.001 M.) of 4-pregnen-17α,21-diol-3,11,20-trione 21-laurate in 11.6 cc. of methanol, 3.6 cc. of dimethylformamide and 0.344 cc. of water was treated with 0.542 gram of semicarbazide hydrochloride and 0.296 gram of sodium bicrabonate. The mixture was heated under reflux for four hours at the end of which time crystals of the disemicarbazone had begun to deposit. After reducing the bath temperature to 45 to 50° C., the mixture was held at that temperature overnight. This was worked up in the usual manner described in Example 13. After cooling to room temperature and carefully adding 14.5 cc. of water, the yield was 0.630 gram (96%). Melting point S, 220° C., dec. 228–230° C.

U.V.—$\lambda_{Sh. 2450, E\% 414}^{Max. 2680, E\% 563}$

*Example 15*

4-pregnen-17α,21-diol-3,11,20-trione 21-hemisuccinate, 460.5 mg. (0.001 M.) was added to 11.6 cc. of methanol, 3.6 cc. of dimethylformamide and 0.344 cc. of water and the mixture purged with nitrogen. Then, 0.542 gram of semicarbazide hydrochloride was added with 0.371 gram of sodium bicarbonate (an extra 0.001 M. for the .COOH group of hemisuccinate). After heating under reflux for four hours the slightly yellow solution was warmed at 45 to 50° C. overnight. In the morning, no crystals had formed—even after cooling, and 10 cc. of the total 14.5 cc. of water were added before crystallization set in. Upon completing the work up as usual, described in Example 13, the first crop weighed 0.310 gram (54%). Melting point—S, 205° C., dec. 220–225° C.

U.V., $\lambda_{Sh. 2450, E\% 447}^{Max. 2680, E\% 622}$

The second crop weighed 0.090 gram (16%). Melting point S, 205° C., dec. 220–225° C.

U.V., $\lambda_{Sh. 2400, E\% 440}^{Max. 2680, E\% 622}$

Additional product crystallized on long standing.

Any departure from the above description which conforms to the present invention is intended to be included within the scope of the claims.

What is claimed is:

1. A process for the protection of the 20-keto groups of 21-esters of steroids of the pregnane series, which comprises reacting a 20-keto steroid selected from the group consisting of pregnanes, allopregnanes, pregnenes and pregnadienes and having attached to the 17-carbon atom thereof an acyloxymethylcarbonyl radical of the formula $$\overset{O}{\underset{\|}{C}}-CH_2-O-\overset{O}{\underset{\|}{C}}-R$$

wherein R is a hydrocarbon group containing up to 25 carbon atoms, with a nitrogenous ketone reagent of the formula $TH_2$, wherein T is a radical selected from the group consisting of oximino, semicarbazido and arylhydrozino radicals, at a pH within the range of about 3.0 to 6.0, whereby there is formed the corresponding protected steroid wherein the radical attached to the 17-carbon atom has the formula $$-\overset{T}{\underset{\|}{C}}-CH_2-O-\overset{O}{\underset{\|}{C}}-R$$

2. The process of claim 1 wherein T is a semicarbazido radical.

3. The process of claim 1 wherein the 20-keto steroid is a 3,20-diketo steroid and both the 3-keto and the 20-keto groups are protected by reaction with the nitrogenous ketone reagent.

4. The process of claim 1 wherein the 20-keto steroid is a 21-ester of 4-pregnene-17α,21-diol-3,11,20-trione.

5. The process of claim 1 wherein the 20-keto steroid is a 21-ester of 4-bromo-pregnane-17α,21-diol-3,11,20-trione.

6. The process of claim 1 wherein the 20-keto steroid is a 21-ester of allopregnane-3β,17α,21-triol-11,20-dione.

7. The process of claim 1 wherein the 20-keto steroid is a 21-ester of 11-dehydrocorticosterone.

8. The process of claim 1 wherein the 20-keto steroid is a 21-ester of pregnane-3β,17α,21-triol-11,20-dione.

9. The process of claim 1 wherein the 20-keto steroid is a 21-ester of 4-pregnene-11β,17α,21-triol-3,20-dione.

10. A process for the protection of the 20-keto group of 21-esters of steroids of the pregnane series, which comprises heating a mixture of a 20-keto steroid selected from the group consisting of pregnanes, allopregnanes, pregnenes, and pregnadienes and having attached to the 17-carbon atom thereof an acyloxymethylcarbonyl radical of the formula $$\overset{O}{\underset{\|}{C}}-CH_2-O-\overset{O}{\underset{\|}{C}}-R$$

wherein R is a hydrocarbon group containing up to 25 carbon atoms, and a nitrogenous ketone reagent of the formula $TH_2$, wherein T is a radical selected from the group consisting of oximino, semicarbazido and arylhydrazino radicals, in a solvent which is non-reactive with said ketone reagent, at a pH within the range of about 3.0 to 6.0, whereby there is formed the corresponding protected steriod wherein the radical attached to the 17-carbon atom has the formula $$-\overset{T}{\underset{\|}{C}}-CH_2-O-\overset{O}{\underset{\|}{C}}-R$$

11. The process of claim 10 wherein the reaction is conducted at the reflux temperature of the solvent.

12. The process of claim 10 wherein the ketone reagent is present in excess of the amount theoretically required to react with the keto group.

13. The process of claim 10 wherein the solvent is a mixture of methanol, dimethylformamide and water.

14. The process of claim 10 wherein the solvent is acetonitrile.

15. The process of claim 10 wherein the ketone reagent is dissolved by employing a small amount of water therewith.

16. The process of claim 10 wherein the hydrogen ion concentration of the reaction mixture is maintained at about pH 3.0 to 6.0 by means of addition of a weakly basic buffer.

17. The process of claim 10 wherein the hydrogen ion concentration is within the range of about pH 4.0 to 5.2.

References Cited in the file of this patent

UNITED STATES PATENTS

| | | |
|---|---|---|
| 2,590,978 | Kendall | Apr. 1, 1952 |
| 2,590,993 | McGuckin et al. | Apr. 1, 1952 |
| 2,628,966 | Graber | Feb. 17, 1953 |
| 2,656,367 | Graber | Oct. 20, 1953 |
| 2,734,907 | Levin | Feb. 14, 1956 |
| 2,778,842 | Fonken | Jan. 22, 1957 |
| 2,781,367 | Day | Feb. 12, 1957 |
| 2,849,463 | Joly et al. | Aug. 26, 1958 |

OTHER REFERENCES

Fieser et al.: Organic Chemistry, 2nd ed., pages 213–214 (1950).

Shriner et al.: The Systematic Identification of Organic Compounds, 3rd edition, pages 8, 9, 201, 262–265 (1948).

Fieser et al.: Natural Products Related to Phenanthrene, 3rd ed., page 407 (1949), and page 655 (1949).